(12) United States Patent
Yamamoto et al.

(10) Patent No.: US 11,255,074 B2
(45) Date of Patent: Feb. 22, 2022

(54) CONTROL SYSTEM FOR WORK VEHICLE, CONTROL METHOD, AND WORK VEHICLE

(71) Applicant: KOMATSU LTD., Tokyo (JP)

(72) Inventors: Hiroki Yamamoto, Kobe (JP); Shinichiro Hosoya, Kamakura (JP); Takashi Noda, Hirakata (JP)

(73) Assignee: KOMATSU LTD., Tokyo (JP)

(*) Notice: Subject to any disclaimer, the term of this patent is extended or adjusted under 35 U.S.C. 154(b) by 916 days.

(21) Appl. No.: 15/540,292

(22) PCT Filed: Mar. 3, 2016

(86) PCT No.: PCT/JP2016/056635
§ 371 (c)(1),
(2) Date: Jun. 28, 2017

(87) PCT Pub. No.: WO2016/143670
PCT Pub. Date: Sep. 15, 2016

(65) Prior Publication Data
US 2018/0002894 A1 Jan. 4, 2018

Related U.S. Application Data

(60) Provisional application No. 62/130,867, filed on Mar. 10, 2015.

(51) Int. Cl.
*E02F 3/76* (2006.01)
*E02F 9/20* (2006.01)
(Continued)

(52) U.S. Cl.
CPC ............ *E02F 9/2066* (2013.01); *B60K 31/00* (2013.01); *F02D 29/02* (2013.01); *F02D 29/04* (2013.01);
(Continued)

(58) Field of Classification Search
CPC combination set(s) only.
See application file for complete search history.

(56) References Cited

U.S. PATENT DOCUMENTS 6,081,761 A * 6/2000 Harada .................. B60T 8/246
701/72
6,532,407 B1 * 3/2003 Fuhrer .................. B60K 31/047
280/5.5
(Continued)

FOREIGN PATENT DOCUMENTS

JP 2002-521272 A 7/2002
JP 2013-104236 A 5/2013

OTHER PUBLICATIONS

The International Search Report for the corresponding international application No. PCT/JP2016/056635, dated May 24, 2016.

Primary Examiner — Christian Chace
Assistant Examiner — Jordan S Fei
(74) Attorney, Agent, or Firm — Global IP Counselors, LLP

(57) ABSTRACT

A control system for a work vehicle includes an acceleration detection device and a controller. The acceleration detection device detects an acceleration of the work vehicle. The controller determines whether the acceleration is greater than a first threshold and reduces the a vehicle speed when the acceleration continues to be equal to or greater than the first threshold over a predetermined first determination time period.

12 Claims, 9 Drawing Sheets

(51) Int. Cl.
*B60K 31/00* (2006.01)
*F02D 29/02* (2006.01)
*F02D 29/04* (2006.01)
*F02D 41/02* (2006.01)
*F02D 41/04* (2006.01)
*F02D 41/10* (2006.01)
*B62D 11/00* (2006.01)
*E02F 3/84* (2006.01)

(52) U.S. Cl.
CPC ......... *F02D 41/021* (2013.01); *F02D 41/045* (2013.01); *F02D 41/107* (2013.01); *B62D 11/00* (2013.01); *E02F 3/7604* (2013.01); *E02F 3/841* (2013.01); *E02F 9/205* (2013.01); *F02D 2200/501* (2013.01); *F02D 2200/702* (2013.01)

(56) References Cited

U.S. PATENT DOCUMENTS

| | | | |
|---|---|---|---|
| 2003/0088355 A1* | 5/2003 | Fuhrer | B60K 31/047 701/93 |
| 2004/0135431 A1* | 7/2004 | Sekine | B60T 8/17558 303/140 |
| 2006/0136111 A1* | 6/2006 | Robert | F16H 59/66 701/65 |
| 2009/0184573 A1* | 7/2009 | Nakajima | B60T 8/00 303/155 |
| 2014/0257645 A1 | 9/2014 | Date | |
| 2015/0258993 A1* | 9/2015 | Chakravarty | B60W 30/20 701/93 |
| 2016/0137152 A1* | 5/2016 | Park | B60R 21/0132 701/45 |

* cited by examiner

CONTROL SYSTEM FOR WORK VEHICLE, CONTROL METHOD, AND WORK VEHICLE

CROSS-REFERENCE TO RELATED APPLICATIONS

This application is a U.S. National stage application of International Application No. PCT/JP2016/056635, filed on Mar. 3, 2016. This U.S. National stage application claims priority under 35 U.S.C. § 119(e) to the U.S. Provisional Patent Application No. 62/130867, filed in the U.S. on Mar. 10, 2015, the entire contents of which are hereby incorporated herein by reference.

BACKGROUND

Field of the Invention

The present invention relates to a control system for a work vehicle, a control method, and a work vehicle.

Background

A work vehicle includes an operating member for adjusting the vehicle speed, and an operator manually adjusts the vehicle speed by operating the operating member. For example, the bulldozer in Japanese Patent Laid-open No. 2013-104236 includes a deceleration pedal. Moreover, the bulldozer includes a throttle dial and the engine rotation speed is set with the throttle dial. A bulldozer normally travels at a fixed speed at the set engine rotation speed, and the operator reduces the speed of the vehicle by operating the deceleration pedal.

SUMMARY

When a work vehicle is traveling over uneven terrain, the vehicle is subjected to vibrations due to the unevenness of the road surface. When the vehicle continues to travel at a high speed over the uneven terrain, excessively large vibrations are continuously applied to the vehicle. In this case, there is a concern that the machine lifespan will become shorter while the vehicle continues to be subjected to the load from the vibrations.

In order to reduce the vibrations of the vehicle, the speed of the traveling of the vehicle is preferably reduced. However, the vehicle is only subjected to small vibrations in locations where the unevenness of the road surface is small even when traveling at a high speed. There is a problem that work efficiency is reduced when the vehicle continues to travel at a low speed in the above case.

An object of the present invention is to limit a reduction in work efficiency and limit the continuous application of excessively large vibrations on the vehicle by suitably adjusting the vehicle speed in response to the state of the road surface.

A control system for a work vehicle according to a first aspect includes an acceleration detection device and a controller. The acceleration detection device detects an acceleration of the vehicle. The controller determines whether the acceleration is greater than a first threshold and reduces the vehicle speed when the acceleration continues to be equal to or greater than the first threshold over a predetermined first determination time period.

The vehicle speed is reduced when the acceleration continues to be equal to or greater than the first threshold over the predetermined first determination time period in the control system of the work vehicle according to the present aspect. The acceleration becomes greater because the attitude of the vehicle changes greatly in a location with a large amount of unevenness of the road surface. Therefore, the increase in the acceleration indicates that the amount of unevenness of the road surface is large. Thus, vibrations of the vehicle due to the amount of unevenness of the road surface can be reduced by reducing the vehicle speed when the acceleration is equal to or greater than the first threshold. Consequently, the continuous application of excessively large vibrations on the vehicle can be suppressed. Moreover, because the vehicle speed is automatically reduced on the basis of the acceleration, the vehicle may not necessarily travel constantly at a low speed to suppress vibrations. As a result, a reduction in the work efficiency can be limited.

The controller may determine whether the acceleration is equal to or less than a second threshold and may increase the vehicle speed when the acceleration continues to be equal to or less than the second threshold over a predetermined second determination time period. In this case, the vehicle speed can be increased when the amount of unevenness on the road surface is small and the vibrations of the vehicle is small. Accordingly, work efficiency can be improved.

The acceleration may include acceleration in the up-down direction of the vehicle. In this case, the state of the road surface can be detected with high precision from the vibrations in the up-down direction of the vehicle.

The acceleration may include acceleration in the left-right direction of the vehicle. In this case, the state of the road surface can be detected with high precision from the vibrations in the left-right direction of the vehicle.

The acceleration may include acceleration in the front-back direction of the vehicle. In this case, the state of the road surface can be detected with high precision from the vibrations in the front-back direction of the vehicle.

The controller may determine whether a synthesized acceleration, which is synthesized from at least two of the acceleration in the up-down direction, the acceleration in the left-right direction, and the acceleration in the front-back direction of the vehicle, is equal to or greater than the first threshold. In this case, the magnitude of the load received by the vehicle due to the vibrations can be detected with high precision.

The control system of the work vehicle may further include a turning operating member for operating turning of the vehicle. When the turning operating member is operated, the controller may not change the vehicle speed even when it is determined that the acceleration is equal to or greater than the first threshold.

The controller may carry out low-pass filtering on the acceleration. In this case, the computation load of the controller can be reduced.

The controller may carry out high-pass filtering on the acceleration. In this case, the acceleration of the vehicle caused by the unevenness of the road surface can be detected with high precision.

The controller may carry out moving average processing on the acceleration. In this case, the acceleration of the vehicle caused by the unevenness of the road surface can be detected with high precision.

A control method of the work vehicle according to a second aspect includes first to fourth steps. In the first step, detection signals are received indicating accelerations in a plurality of directions of the vehicle. In the second step, at least two of the accelerations in the plurality of directions are synthesized and a synthesized acceleration is computed. In the third step, a determination is made as to whether the synthesized acceleration is equal to or greater than a first threshold. In the fourth step, a command signal for reducing the vehicle speed is output when the synthesized acceleration is equal to or greater than the first threshold.

The vehicle speed is reduced when the acceleration is equal to or greater than the first threshold in the control method of the work vehicle according to the present aspect. The acceleration becomes greater because the attitude of the vehicle changes greatly in a location with a large amount of unevenness of the road surface. Therefore, the increase in the acceleration indicates that the amount of unevenness of the road surface is large. Therefore, vibrations of the vehicle due to the amount of unevenness of the road surface can be reduced by reducing the vehicle speed when the acceleration is equal to or greater than the first threshold. Consequently, the continuous application of excessively large vibrations on the vehicle can be suppressed. Moreover, because the vehicle speed is automatically reduced on the basis of the acceleration, the vehicle may not necessarily travel constantly at a low speed to suppress vibrations. As a result, a reduction in the work efficiency can be limited.

A control method of the work vehicle according to a third aspect includes first to fifth steps. In the first step, a detection signal is received indicating an acceleration of the vehicle. In the second step, a determination is made as to whether the acceleration is equal to or greater than a first threshold. In the third step, a command signal for reducing the vehicle speed is output when the acceleration is equal to or greater than the first threshold. In the fourth step, a determination is made as to whether the acceleration is equal to or less than a second threshold. In the fifth step, a command signal for increasing the vehicle speed is output when the acceleration is equal to or less than the second threshold.

The vehicle speed is reduced when the acceleration is equal to or greater than the first threshold in the control method of the work vehicle according to the present aspect. The acceleration becomes greater because the attitude of the vehicle changes greatly in a location with a large amount of unevenness of the road surface. Therefore, the increase in the acceleration indicates that the amount of unevenness of the road surface is large. Therefore, vibrations of the vehicle due to the amount of unevenness of the road surface can be reduced by reducing the vehicle speed when the acceleration is equal to or greater than the first threshold. Consequently, the continuous application of excessively large vibrations on the vehicle can be suppressed. Moreover, because the vehicle speed is automatically reduced on the basis of the acceleration, the vehicle may not necessarily travel constantly at a low speed to suppress vibrations. As a result, a reduction in the work efficiency can be limited.

A work vehicle according to a fourth aspect includes an acceleration detection device and a controller. The acceleration detection device detects the acceleration of the vehicle. The controller reduces the vehicle speed when the acceleration continues to be equal to or greater than a first threshold over a predetermined determination time period.

The vehicle speed is reduced when the acceleration continues to be equal to or greater than the first threshold over the predetermined determination time period in the work vehicle according to the present aspect. The acceleration becomes greater because the attitude of the vehicle changes greatly in a location with a large amount of unevenness of the road surface. Therefore, the increase in the acceleration indicates that the amount of unevenness of the road surface is large. Therefore, vibrations of the vehicle due to the amount of unevenness of the road surface can be reduced by reducing the vehicle speed when the acceleration is equal to or greater than the first threshold. Consequently, the continuous application of excessively large vibrations on the vehicle can be suppressed. Moreover, because the vehicle speed is automatically reduced on the basis of the acceleration, the vehicle may not necessarily travel constantly at a low speed to suppress vibrations. As a result, a reduction in the work efficiency can be limited.

According to the present invention, a reduction in work efficiency is limited and the continuous application of excessively large vibrations on the vehicle is limited by suitably adjusting the vehicle speed in response to the state of the road surface.

DETAILED DESCRIPTION OF EXEMPLARY EMBODIMENTS

Figure 1:
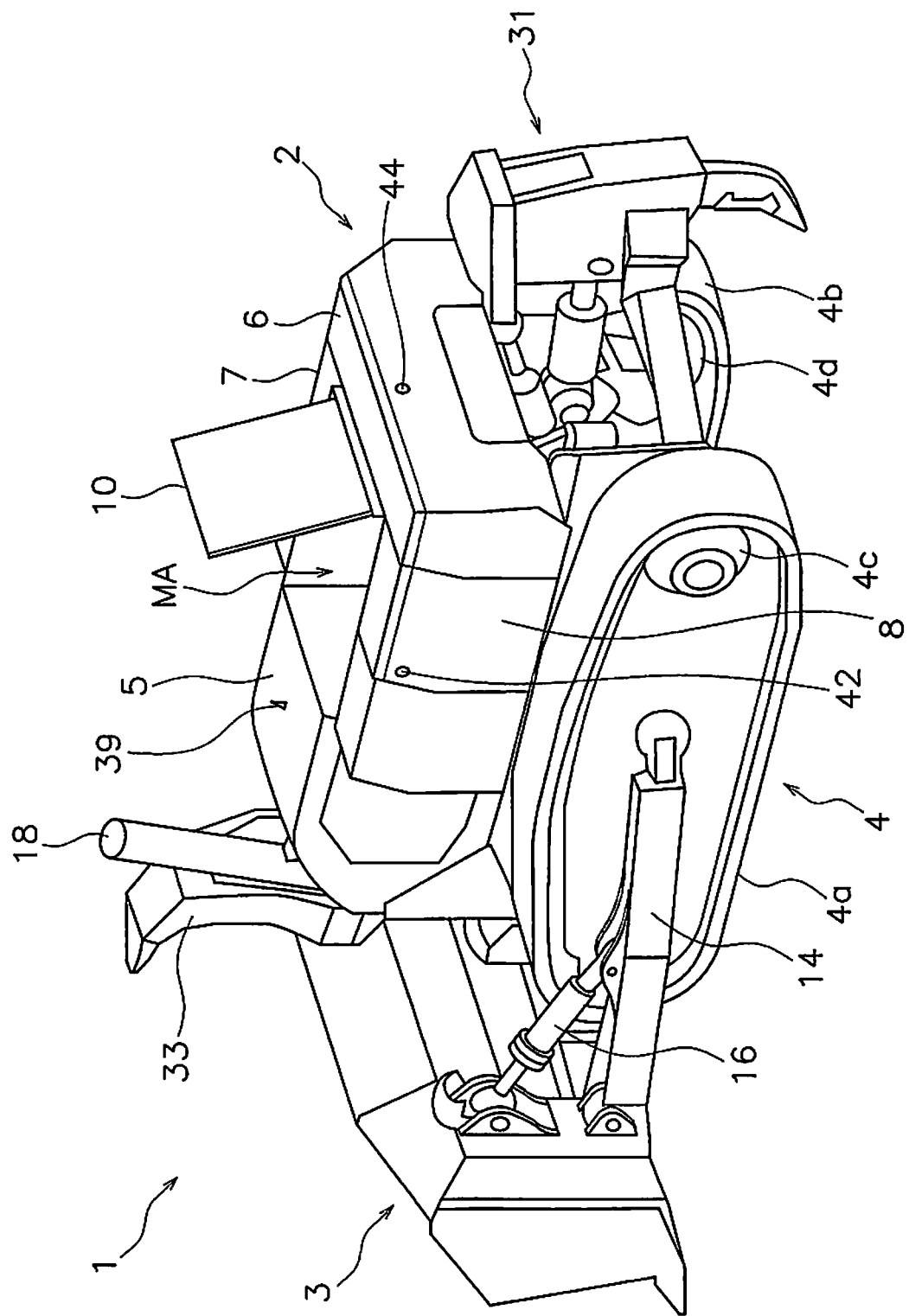
FIG. 1 is a perspective view of a work vehicle according to an exemplary embodiment.
Figure 2:
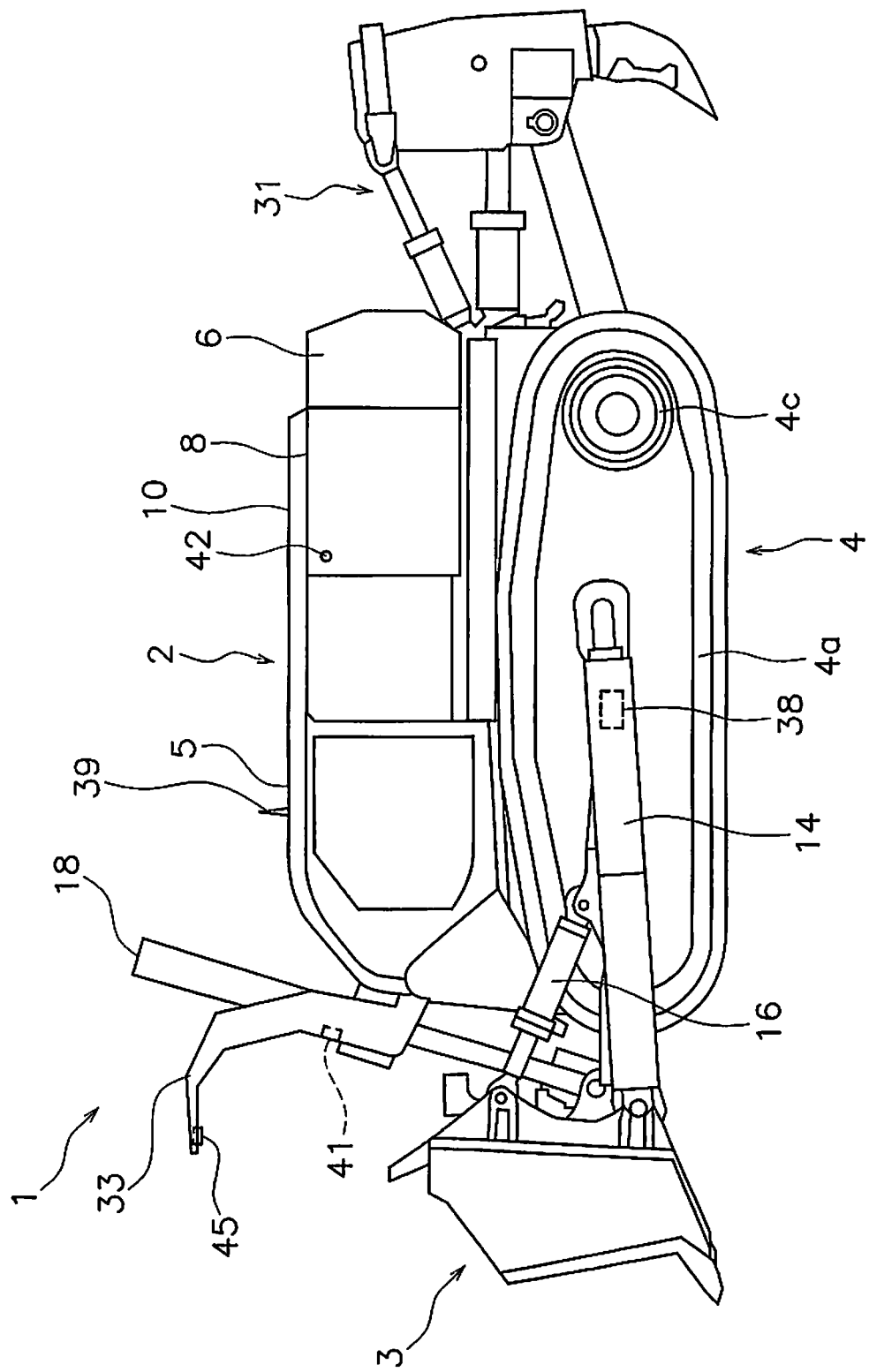
FIG. 2 is side elevational view of the work vehicle.
Figure 3:
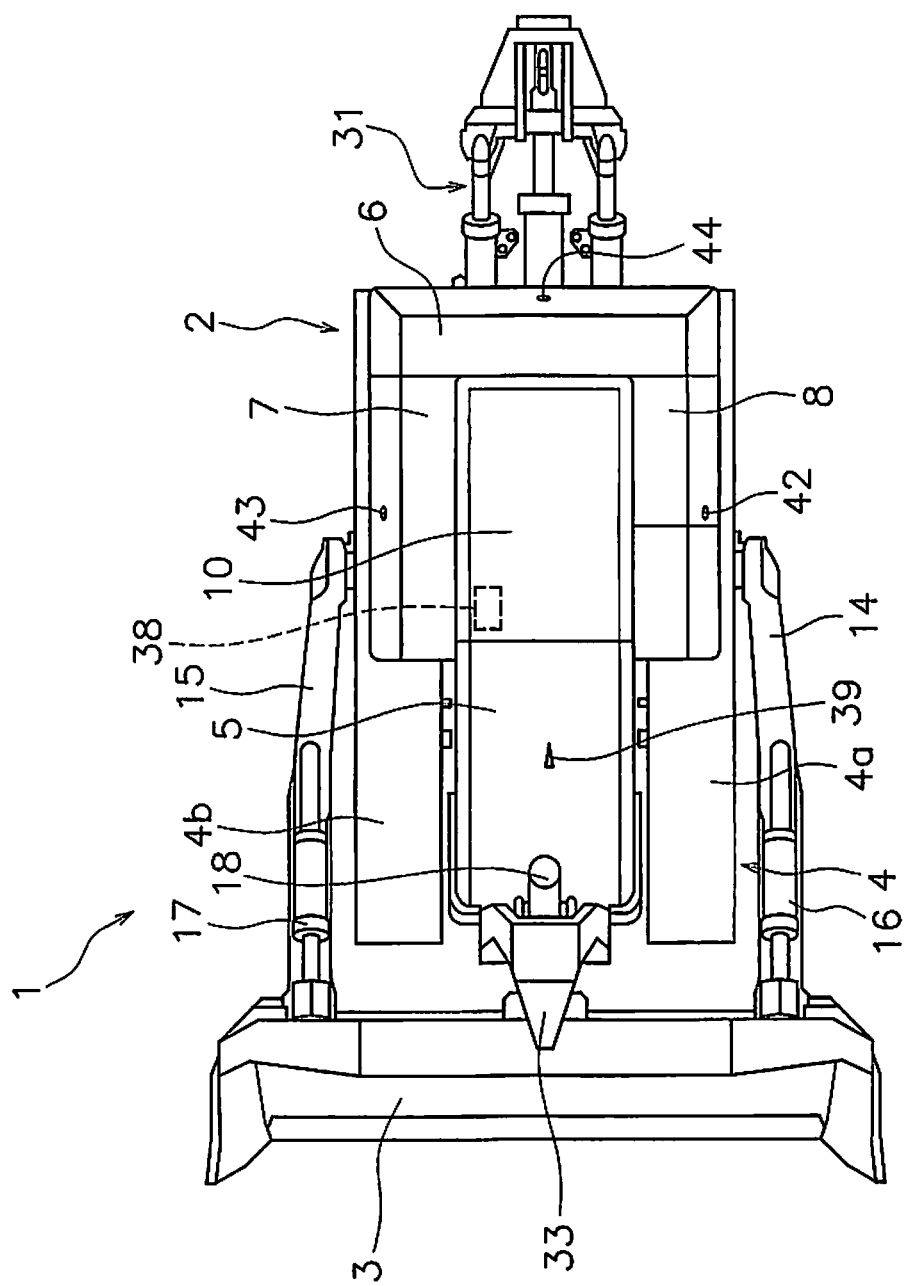
FIG. 3 is top plan view of the work vehicle.

The following is a description of a work vehicle according to an exemplary embodiment with reference to the drawings. FIG. 1 is a perspective view of a work vehicle 1 according to the exemplary embodiment. FIG. 2 is a side elevational view of the work vehicle 1. FIG. 3 is a top plan view of the work vehicle 1. The work vehicle 1 is a bulldozer according to the present exemplary embodiment. The work vehicle 1 is a vehicle that is not provided with an operator's cab. As discussed below, the work vehicle 1 can be operated remotely. The work vehicle 1 includes a vehicle body 2 and a work implement 3.

The vehicle body 2 has a travel device 4 and an engine compartment 5. The travel device 4 is a device for causing the work vehicle 1 to travel. The travel device 4 has crawler belts 4a and 4b and drive wheels 4c and 4d. The crawler belt 4a is mounted on the left side part of the vehicle body 2. The crawler belt 4b is mounted on the right side part of the vehicle body 2. A portion of the crawler belt 4a is wound onto the drive wheel 4c. A portion of the crawler belt 4b is wound onto the drive wheel 4d. The crawler belts 4a and 4b are driven by the rotation of the drive wheels 4c and 4d whereby the work vehicle 1 travels.

The front in the present exemplary embodiment signifies the direction in which the work implement 3 is disposed on the vehicle body 2, and the rear signifies the opposite direction. Left and right signify the left and right directions when facing the above-mentioned front direction.

The engine compartment 5 is disposed in the front part of the vehicle body 2. An engine 11 (see FIG. 4) is disposed inside the engine compartment 5.

The vehicle body 2 has a rear compartment 6, a right compartment 7, and a left compartment 8. The engine compartment 5, the rear compartment 6, the right compartment 7, and the left compartment 8 are disposed so as to surround a maintenance area MA. The engine compartment 5 is disposed in front of the maintenance area MA. The rear compartment 6 is disposed behind the maintenance area MA. The right compartment 7 is disposed to the right of the maintenance area MA. The left compartment 8 is disposed to the left of the maintenance area MA.

For example, the rear compartment 6 is a fuel tank. Alternatively, the fuel tank may be housed inside the rear compartment 6. A cooling device, such as a radiator, is disposed in the right compartment 7. The left compartment 8 is a hydraulic fluid tank. Alternatively, the hydraulic fluid tank may be housed inside the left compartment 8. However, the items housed in the compartments 6-8 are not limited to the above items and may be changed.

A lid member 10 is disposed above the maintenance area MA. The lid member 10 is disposed so as to be able to open and close the maintenance area MA. The lid member 10 is depicted as open in FIG. 1 and the lid member 10 is depicted as closed in FIGS. 2 and 3.

Doors (not illustrated) for opening and closing the engine compartment 5 and the right compartment 7 are provided facing the maintenance area MA on the engine compartment 5 and on the right compartment 7. A worker is able to access the inside of the engine compartment 5 and the inside of the right compartment 7 from the maintenance area MA by opening the door on the engine compartment 5 or on the right compartment 7.

The work implement 3 is disposed in front of the vehicle body 2. The work implement 3 is disposed in front of the engine compartment 5. In the present exemplary embodiment, the work implement 3 is a blade. The work implement 3 is supported by a left arm 14 and a right arm 15. The left arm 14 is attached to the left side part of the vehicle body 2. The right arm 15 is attached to the right side part of the vehicle body 2.

A left tilt cylinder 16, a right tilt cylinder 17, and a lift cylinder 18 are attached to the work implement 3. The left tilt cylinder 16 is attached to the left side part of the vehicle body 2. The right tilt cylinder 17 is attached to the right side part of the vehicle body 2. The left tilt cylinder 16 and the right tilt cylinder 17 are driven by hydraulic fluid from a hydraulic pump 12. The left tilt cylinder 16 and the right tilt cylinder 17 cause the work implement 3 to move to the left or right.

The lift cylinder 18 is attached to the center part of the vehicle body 2 in the vehicle width direction. The lift cylinder 18 is attached to the vehicle body 2 while being inclined in the front-back direction of the vehicle body 2. Only one lift cylinder 18 is provided in the work vehicle 1. The lift cylinder 18 is provided in front of the engine compartment 5. The lift cylinder 18 is provided behind the work implement 3. The lift cylinder 18 is driven by hydraulic fluid from the hydraulic pump 12. The lift cylinder 18 moves the work implement 3 up and down.

A horn 33 is attached to the front part of the vehicle body 2. The horn 33 is disposed in front of the engine compartment 5. The horn 33 extends to a position higher than the work implement 3. The horn 33 extends to a position higher than the engine compartment 5.

The work vehicle 1 includes a ripper device 31. The ripper device 31 is disposed behind the vehicle body 2. The ripper device 31 is attached to the vehicle body 2. The ripper device 31 may be omitted.

Figure 4:
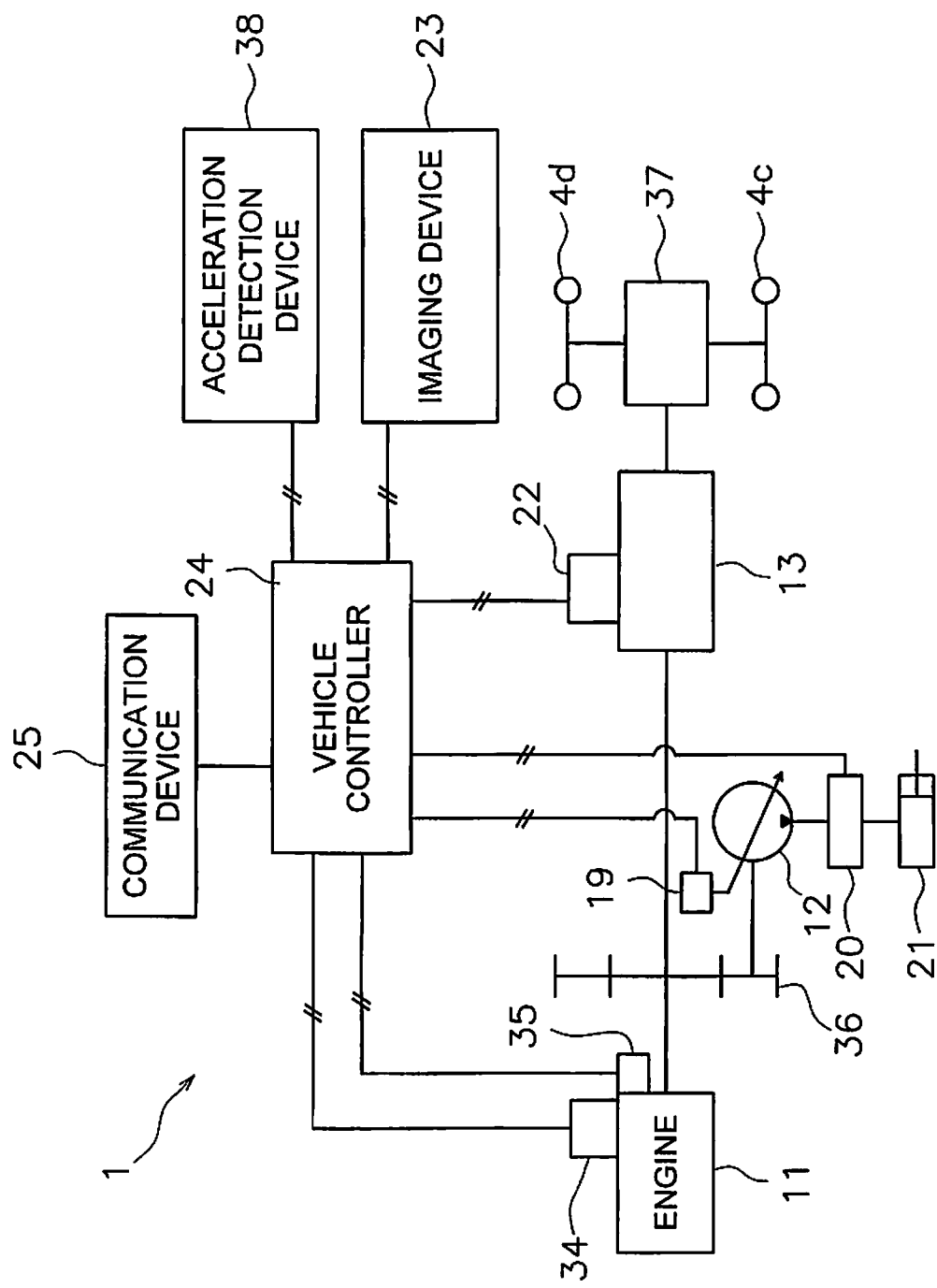
FIG. 4 is a block diagram illustrating a configuration of the work vehicle.

FIG. 4 is a block diagram illustrating a configuration of the work vehicle 1. As illustrated in FIG. 4, the work vehicle 1 includes the engine 11, the hydraulic pump 12, and a pump displacement control device 19. A fuel supply device 34 and an engine rotation speed sensor 35 are provided on the engine 11. The fuel supply device 34 controls the fuel amount supplied to the engine 11. The engine rotation speed is controlled due to the fuel supply device 34 controlling the fuel amount supplied to the engine 11. The engine rotation speed sensor 35 detects the rotation speed of the engine.

The hydraulic pump 12 is driven by the engine 11 to discharge hydraulic fluid. The hydraulic pump 12 is a variable displacement pump and the pump displacement control device 19 controls the discharge displacement of the hydraulic pump 12.

The work vehicle 1 includes a work implement control valve 20 and a hydraulic actuator 21. The hydraulic actuator 21 is driven by hydraulic fluid discharged from the hydraulic pump 12. For example, the hydraulic actuator 21 includes the above-mentioned lift cylinder 18 and the left and right tilt cylinders 16 and 17. The work implement control valve 20 controls the supply and exhaust of the hydraulic fluid to and from the hydraulic actuator 21.

The work vehicle 1 includes a power take-off (PTO) 36, a power transmission device 13, and a clutch control valve 22. The PTO 36 distributes the driving power of the engine 11 to the hydraulic pump 12 and the power transmission device 13.

The power transmission device 13 includes, for example, a transmission and a torque converter. The power transmission device 13 transmits the driving power from the engine 11 to the drive wheels 4c and 4d through a final drive gear 37. The clutch control valve 22 controls the switching of a speed change clutch, a forward/reverse clutch, and a steering clutch and the like included in the power transmission device 13.

The work vehicle 1 has an imaging device 23. The imaging device 23 captures images of the surroundings of the work vehicle 1. The imaging device 23 outputs detection signals indicating the captured images. The imaging device 23 has a plurality of cameras 41 to 45 illustrated in FIGS. 1 to 3. As illustrated in FIG. 2, the plurality of cameras 41 and 45 are attached to the horn 33. As illustrated in FIG. 3, the plurality of cameras 42 to 44 are respectively attached to a left side part, a right side part, and a rear part of the vehicle body 2.

As illustrated in FIG. 4, the work vehicle 1 has an acceleration detection device 38. The acceleration detecting device 38 detects acceleration of the work vehicle 1. The acceleration detection device 38 is a multi-axial acceleration detection device for detecting acceleration in a plurality of different directions. Specifically, the acceleration detection device 38 detects acceleration in the up-down direction, acceleration in the left-right direction, and acceleration in the front-back direction of the work vehicle 1. The acceleration detection device 38 is a tri-axial acceleration sensor or an inertial measurement unit (IMU). The acceleration detection device 38 is disposed in a location at the center of gravity, or near the center of gravity, of the work vehicle 1. The acceleration detection device 38 detects the acceleration of the vehicle in the above-mentioned three different directions in real time and outputs the detection signals of the accelerations.

Figure 5:
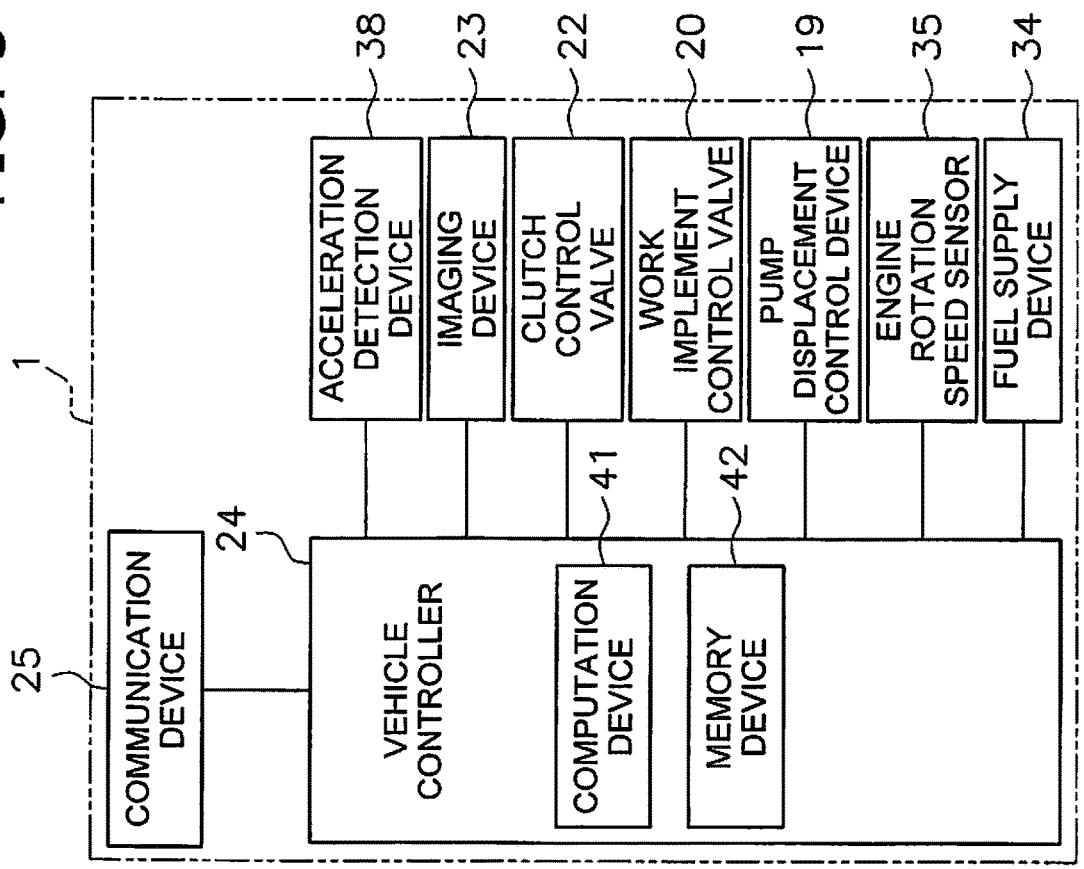
FIG. 5 is a block diagram illustrating a configuration of a control system of the work vehicle.
Figure 5:
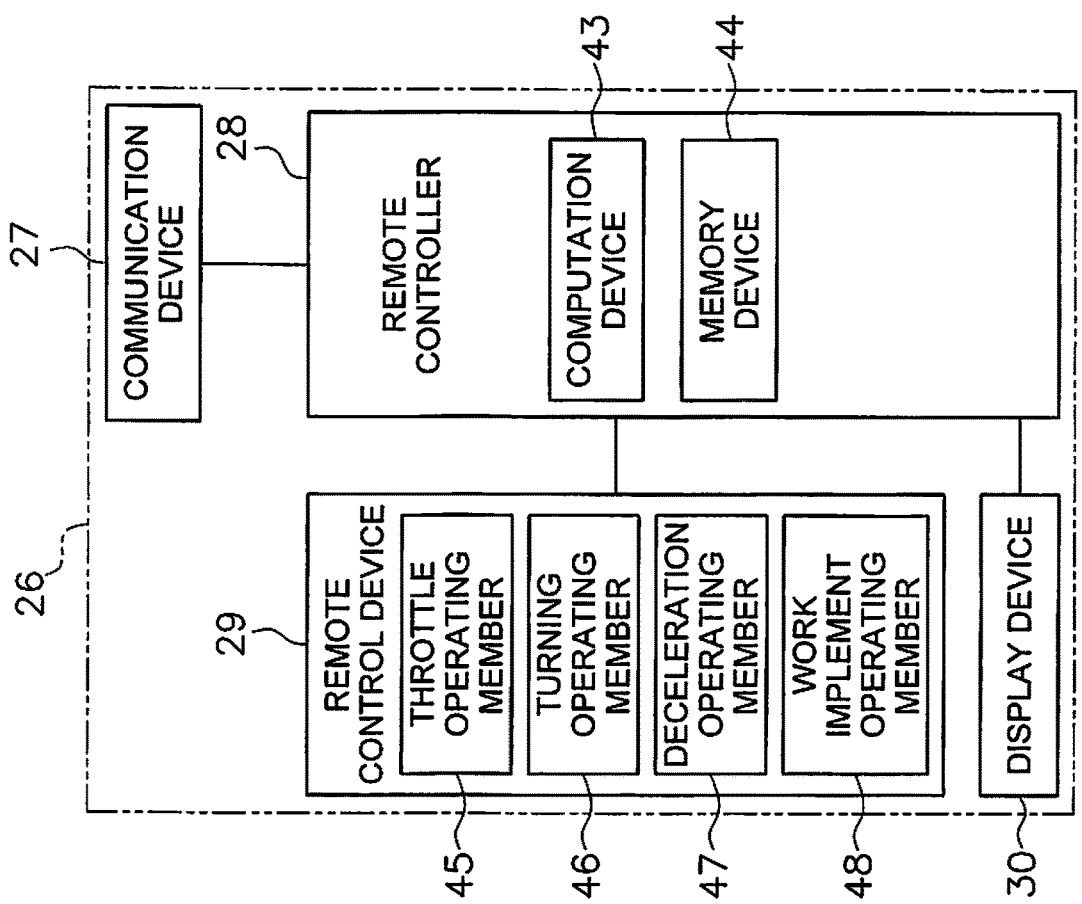

FIG. 5 is a block diagram illustrating a configuration of a control system of the work vehicle 1. As illustrated in FIG. 5, the control system of the work vehicle 1 includes a remote control system 26. The remote control system 26 is disposed, for example, in a base at a location away from the work site where the work vehicle 1 is working. Alternatively, the remote control system 26 may be portable and may be disposed at the work site.

The remote control system 26 includes a communication device 27 and a remote controller 28. Further, the work vehicle 1 includes a vehicle controller 24 and a communication device 25. The communication device 25 in the work vehicle 1 is connected to an antenna 39 (see FIG. 1) mounted on the vehicle body 2. The communication device 25 in the work vehicle 1 communicates wirelessly with the communication device 27 of the remote control system 26.

The vehicle controller 24 has a computation device 41, such as a CPU and the like, and a memory device 42. The memory device 42 is configured with a memory, such as a RAM or a ROM, or with a storage device, such as a hard disk. The vehicle control unit 24 is programmed to control the work vehicle 1 on the basis of operation signals from the remote control system 26.

The vehicle controller 24 receives detection signals, such as the engine rotation speed detected by the engine rotation speed sensor 35, images captured by the imaging device 23, and the accelerations detected by the acceleration detection device 38. The vehicle controller 24 transmits the received detection signals through the communication device 25 to the communication device 27 of the remote control system 26. The remote controller 28 receives the detection signals from the vehicle controller 24 through the communication device 27.

The remote controller 28 has a computation device 43, such as a CPU and the like, and a memory device 44. The memory device 44 is configured with a memory, such as a RAM or a ROM, or with a storage device, such as a hard disk.

The remote control system 26 includes a remote control device 29 and a display device 30. The display unit 30 is configured with a display, such as a CRT, and LCD, or an OELD. However, the display unit 30 is not limited to the afore-mentioned displays and may be another type of display.

The remote controller 28 is programmed to generate display images depicting the surroundings of the work vehicle 1 and display the display images on the display device 30 on the basis of the detection signals which indicate the images captured by the imaging device 23. The operator is able to operate the work vehicle 1 at a location away from the work vehicle 1 by operating the remote control device 29 while viewing the display images.

The remote control device 29 has a throttle operating member 45, a turning operating member 46, a deceleration operating member 47, and a work implement operating member 48. The throttle operating member 45 is a member for setting the engine rotation speed. The operator is able to set the engine rotation speed to a desired value by operating the throttle operating member 45.

The turning operating member 46 is an operating member for turning the work vehicle 1 to the left or right. The operator is able to turn the work vehicle 1 to the left or right by operating the turning operating member 46. The deceleration operating member 47 is an operating member for adjusting the vehicle speed of the work vehicle 1. The operator is able to reduce the vehicle speed of the work vehicle 1 by operating the deceleration operating member 47. The work implement operating member 48 is an operating member for operating the work implement 3. The operator is able to carry out operations, such as a tilt operation of the work implement 3, by operating the work implement operating member 48.

The remote controller 28 transmits command signals indicating the operating contents from the remote control device 29 to the communication device 25 of the work vehicle 1 through the communication device 27. The vehicle controller 24 receives the command signals from the remote controller 28 through the communication device 25. The vehicle controller 24 outputs the command signals to the fuel supply device 34, the pump displacement control device 19, the clutch control valve 22, and the work implement control valve 20 of the work vehicle 1 on the basis of the command signals from the remote controller 28.

Figure 6:
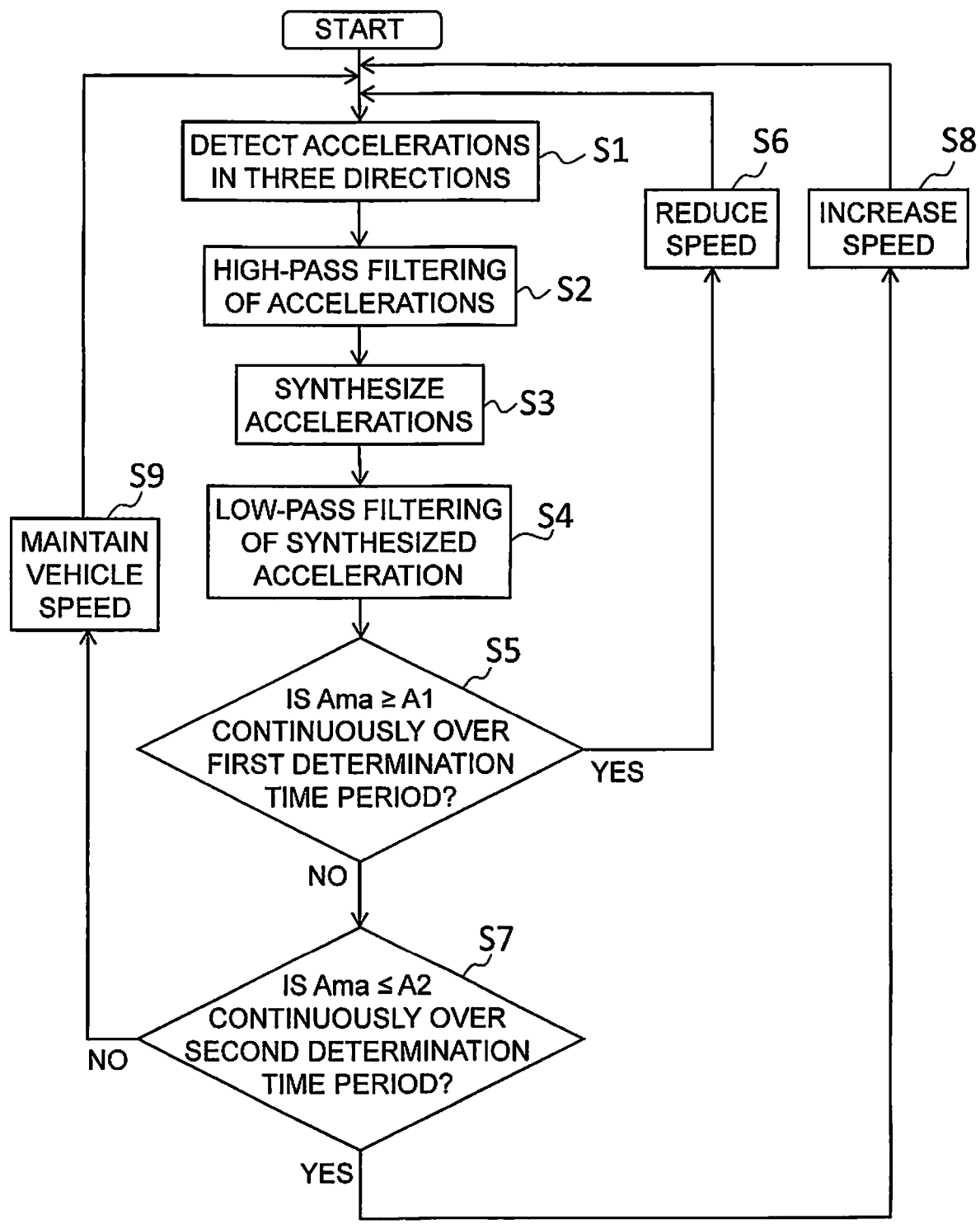
FIG. 6 is a flow chart of processing for a vehicle speed automatic adjustment control.

The control system of the work vehicle 1 according to the present exemplary embodiment executes a vehicle speed automatic adjustment control for suitably controlling the vehicle speed in response to the value of the accelerations detected by the acceleration detection device 38. The following is an explanation of the vehicle speed automatic adjustment control. FIG. 6 is a flow chart of processing for the vehicle speed automatic adjustment control.

As illustrated in FIG. 6, when the work vehicle 1 starts traveling, the accelerations in three directions are detected in step S1. In this case, the remote controller 28 receives the detection signals indicating the acceleration in the up-down direction, the acceleration in the left-right direction, and the acceleration in the front-back direction of the work vehicle 1 detected by the acceleration detection device 38.

In step S2, the remote controller 28 carries out high-pass filtering on the accelerations in the up-down, left-right, and front-back directions. As a result, the gravitational acceleration components included in each of the accelerations are excluded.

In step S3, the remote controller 28 synthesizes the accelerations in the up-down, left-right, and front-back directions. The accelerations are synthesized using the following equation.

$$Ama = \sqrt{Ax^2 + Ay^2 + Az^2} \qquad \text{Equation 1}$$

Ama is the synthesized acceleration. Ax is the acceleration in the left-right direction of the vehicle, Ay is the acceleration in the front-back direction of the vehicle, and Az is the acceleration in the up-down direction of the vehicle.

In step S4, the remote controller 28 carries out low-pass filtering on the synthesized acceleration Ama. The low-pass filtering makes the shape of the synthesized acceleration Ama smoother and thus the computation load of the remote controller 28 can be reduced. In step S5, the remote controller 28 determines whether the synthesized acceleration Ama after the low-pass filtering is equal to or greater than a first threshold A1. The first threshold A1 is stored in the memory device 42.

The comparison of the acceleration Ama and the first threshold A1 is carried out continuously over a predetermined first determination time period (for example, 1 second).

When the acceleration Ama continues to be greater than the first threshold A1 over the first determination time period, the routine advances to step S6. In step S6, the remote controller 28 reduces the vehicle speed. Specifically, the remote controller 28 outputs a command signal for reducing the engine rotation speed. The vehicle controller 24 outputs a command signal to the fuel supply device 34 on the basis of the command signal from the remote controller 28. As a result, the engine rotation speed is reduced.

When the acceleration Ama is less than the first threshold A1 in step S5, the routine advances to step S7. Alternatively, even when the state of the acceleration Ama being equal to or greater than the first threshold A1 is not continued over the first determination time period, the routine advances to step S7. In step S7, the remote controller 28 determines whether the acceleration Ama is equal to or less than a second threshold A2. The second threshold A2 is a value smaller than the first threshold A1. For example, the second threshold A2 is calculated by multiplying the first threshold A1 by a constant r (r <1). However, the second threshold A2 may not be derived by computing and may be a value stored in the memory device 42.

The comparison of the acceleration Ama and the second threshold A2 are continued over a predetermined second determination time period. The second determination time period may be a time period that is the same as the first determination time period. Alternatively, the second determination time period may be a time period that is different from the first determination time period.

When the acceleration Ama continues to be equal to or less than the second threshold A2 over the second determination time period, the routine advances to step S8. In step S8, the remote controller 28 increases the vehicle speed. Specifically, the remote controller 28 outputs a command signal for increasing the engine rotation speed. The vehicle controller 24 outputs a command signal to the fuel supply device 34 on the basis of the command signal from the remote controller 28. As a result, the engine rotation speed is increased.

When the acceleration Ama is greater than the second threshold A2 in step S7, the routine advances to step S9. Alternatively, even when the state of the acceleration Ama being equal to or less than the second threshold A2 is not continued over the second determination time period, the routine advances to step S9. In step S9, the vehicle speed is maintained at the current speed. That is, when the vehicle speed is less than the first threshold A1 and greater than the second threshold A2, the vehicle speed is maintained at the current speed.

When the vehicle speed changes in step S6 and step S8, changing of the vehicle speed is not carried out during a predetermined change stopping time period from the point in time the change of the vehicle speed is completed, that is, from the point in time that the change in the engine rotation speed is completed. For example, during the change stopping time period, any change in the vehicle speed may not be carried out because the determination based on the acceleration is stopped. Alternatively, during the change stopping time period, any change of the vehicle speed may not be carried out by preventing any change of the vehicle speed even when the determination based on the acceleration is carried out.

The above vehicle speed automatic adjustment control is executed whether the work vehicle 1 is traveling forward or in reverse. Moreover, the vehicle speed automatic adjustment control is executed when the work vehicle 1 is traveling for moving without work being carried out with the work implement 3. When a deceleration operation or a turning operation is carried out with the remote control device 29, the vehicle speed automatic adjustment control is canceled. Specifically, when either of the deceleration operating member 47 or the turning operating member 46 is operated at the base, the vehicle controller 24 cancels the vehicle speed automatic adjustment control based on the acceleration determination over the period of operation.

Figure 7:
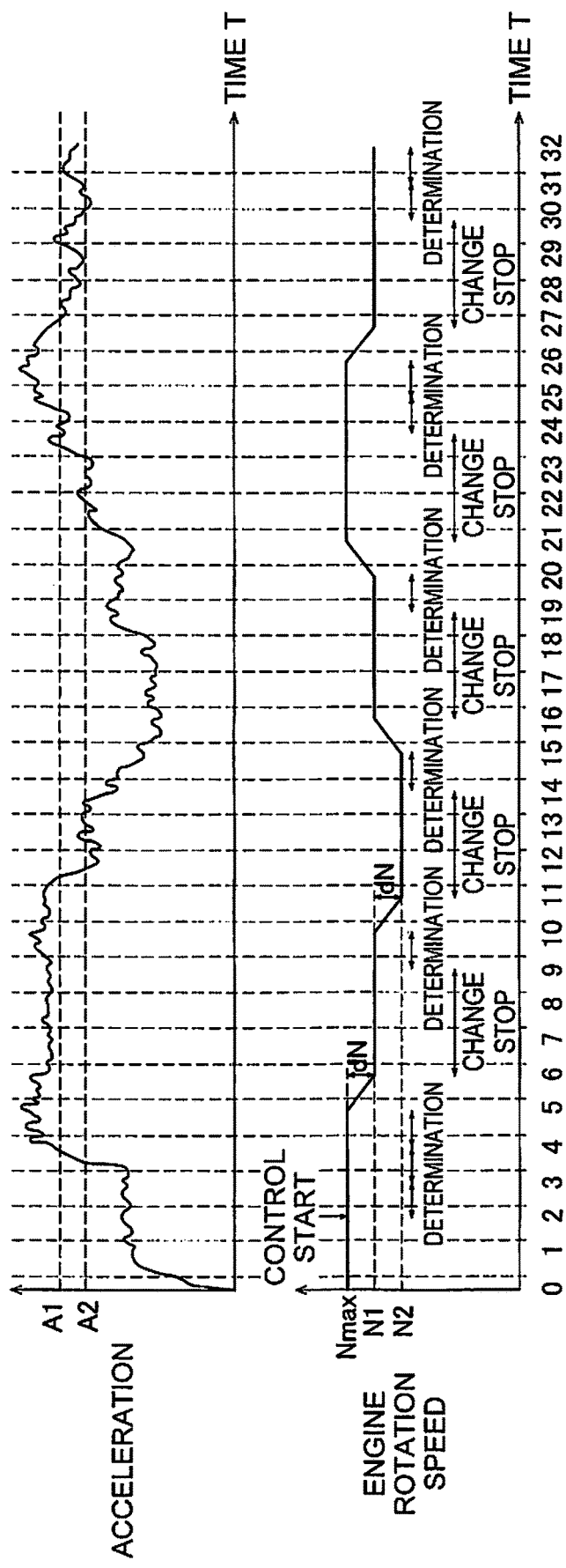
FIG. 7 is a timing chart indicating changes in the acceleration and the engine rotation speed under the vehicle speed automatic adjustment control.

FIG. 7 is a timing chart indicating changes in the acceleration and the engine rotation speed under the vehicle speed automatic adjustment control. The acceleration indicated in FIG. 7 is the synthesized acceleration after the above-mentioned low-pass filtering.

The engine 11 is started at the time T0. At this time, the engine rotation speed is set to a maximum rotation speed Nmax with the throttle operating member 45. The vehicle speed automatic adjustment control is not started during the period from the time T0 to the time T2, and then the vehicle speed automatic adjustment control is started from the time T2. Therefore, the remote controller 28 carries out the acceleration determination over the period from the time T2 to the time T3. The acceleration is equal to or less than the second threshold A2 over the period from the time T2 to the time T3. However, because the engine rotation speed is set to the maximum rotation speed Nmax, there is no increase in the speed during the period from the time T2 to the time T3.

The acceleration continues to be equal to or greater than the first threshold A1 over the period from the time T4 to the time T5 (first determination time period). In this case, the remote controller 28 outputs a command signal so as to reduce the engine rotation speed over the time period from the time T5 to the time T6. Specifically, the remote controller 28 reduces the engine rotation speed to a value N1 which is reduced by a predetermined amount dN from the current value Nmax. As a result, the vehicle speed is reduced.

During the period (change stopping time period) from the time T6 when the reduction of the engine rotation speed is completed until the time T9, no change in the engine rotation speed is carried out. As a result the engine rotation speed is maintained at N1 over the period from the time T6 to the time T9 even when the acceleration continues to be equal to or greater than the first threshold A1 over the first determination time period.

The acceleration continues to be equal to or greater than the first threshold A1 over the period from the time T9 to the time T10 (first determination time period) after the change stopping time period has elapsed. As a result, the remote controller 28 reduces the engine rotation speed to a value N2 which is reduced by the predetermined amount dN from the current value N1 over the time period from the time T10 to the time T11. Consequently, the vehicle speed is reduced further.

During the period (change stopping time period) from the time T11 when the reduction of the engine rotation speed is completed until the time T14, no change of the engine rotation speed is carried out. As a result, the engine rotation speed is maintained at N2 over the period from the time Ill to the time T14 even when the acceleration continues to be equal to or less than the second threshold A2 over the second determination time period.

The acceleration continues to be equal to or less than the second threshold A2 over the period from the time T14 to the time T15 (second determination time period) after the change stopping time period has elapsed. As a result, the remote controller 28 increases the engine rotation speed over the time period from the time T15 to the time T16 to the value N1 which is increased by the predetermined amount dN from the current value N2. Consequently, the vehicle speed increases.

During the period (change stopping time period) from the time T16 when the reduction of the engine rotation speed is completed until the time T19, no change of the engine rotation speed is carried out. The acceleration continues to be equal to or less than the second threshold A2 over the period from the time T19 to the time T20 (second determination time period) after the change stopping time period has elapsed. As a result, the remote controller 28 increases the engine rotation speed over the time period from the time T20 to the time T21 to the value Nmax which is increased by the predetermined amount dN from the current value N1. Consequently, the vehicle speed increases further.

During the period from the time T21 when the reduction of the engine rotation speed is completed until the time T24 (change stopping time period), no change of the engine rotation speed is carried out. The acceleration is less than the first threshold A1 and greater than the second threshold A2 over the period from the time T24 to the time T25 after the change stopping time period has elapsed. Alternatively, the state of the acceleration being equal to or greater than the first threshold A1 is not continued. As a result, the engine rotation speed is maintained at the current value Nmax over the period from the time T24 to the time T25.

Thereafter, the acceleration continues to be equal to or greater than the first threshold A1 over the period from the time T25 to the time T26 (first determination time period). As a result, the remote controller 28 reduces the engine rotation speed to the value N1 which is reduced by the predetermined amount dN from the current value Nmax over the time period from the time T26 to the time T27. As a result, the vehicle speed is reduced.

During the period (change stopping time period) from the time T27 when the reduction of the engine rotation speed is completed until the time T30, no change of the engine rotation speed is carried out. The acceleration is less than the first threshold A1 and greater than the second threshold A2 over the period from the time T30 to the time T32 after the change stopping time period has elapsed. Alternatively, the state of the acceleration being equal to or less than the second threshold A2 is not continued. As a result, the engine rotation speed is maintained at the current value N1 over the period from the time T30 to the time T32.

In the control system of the work vehicle 1 according to the present exemplary embodiment explained above, the vehicle speed is adjusted in response to the value of the acceleration according to the vehicle speed automatic adjustment control. When the work vehicle 1 is traveling, acceleration in the vehicle is generated by the changes in the attitude of the vehicle when there is unevenness on the road surface. The value of the acceleration changes in response to the degree of the unevenness on the road surface. Thus, the degree of unevenness on the road surface can be detected by the value of the acceleration. Therefore, the vehicle speed is adjusted in response to the acceleration whereby the vehicle speed can be controlled suitably in response to the degree of unevenness on the road surface with the above-mentioned vehicle speed automatic adjustment control.

Specifically, when the acceleration continues to be equal to or greater than the first threshold A1 over the first determination time period, the vehicle speed is reduced. As a result, the vehicle speed is automatically reduced when the work vehicle 1 travels over a terrain with large undulations and thus unnecessary shocks to the vehicle can be suppressed.

Moreover, when the acceleration continues to be equal to or less than the second threshold A2 over the second determination time period, the vehicle speed is increased. As a result, work efficiency can be improved by avoiding meaningless low speed travel when traveling over terrain with small undulations.

Although the exemplary embodiment of the present invention has been described so far, the present invention is not limited to the above exemplary embodiment and various modifications may be made within the scope of the invention.

While a bulldozer is exemplified as the work vehicle 1 in the above exemplary embodiment, the work vehicle 1 may also be a dump truck, a wheel loader, a hydraulic excavator, or another type of vehicle.

Figure 8:
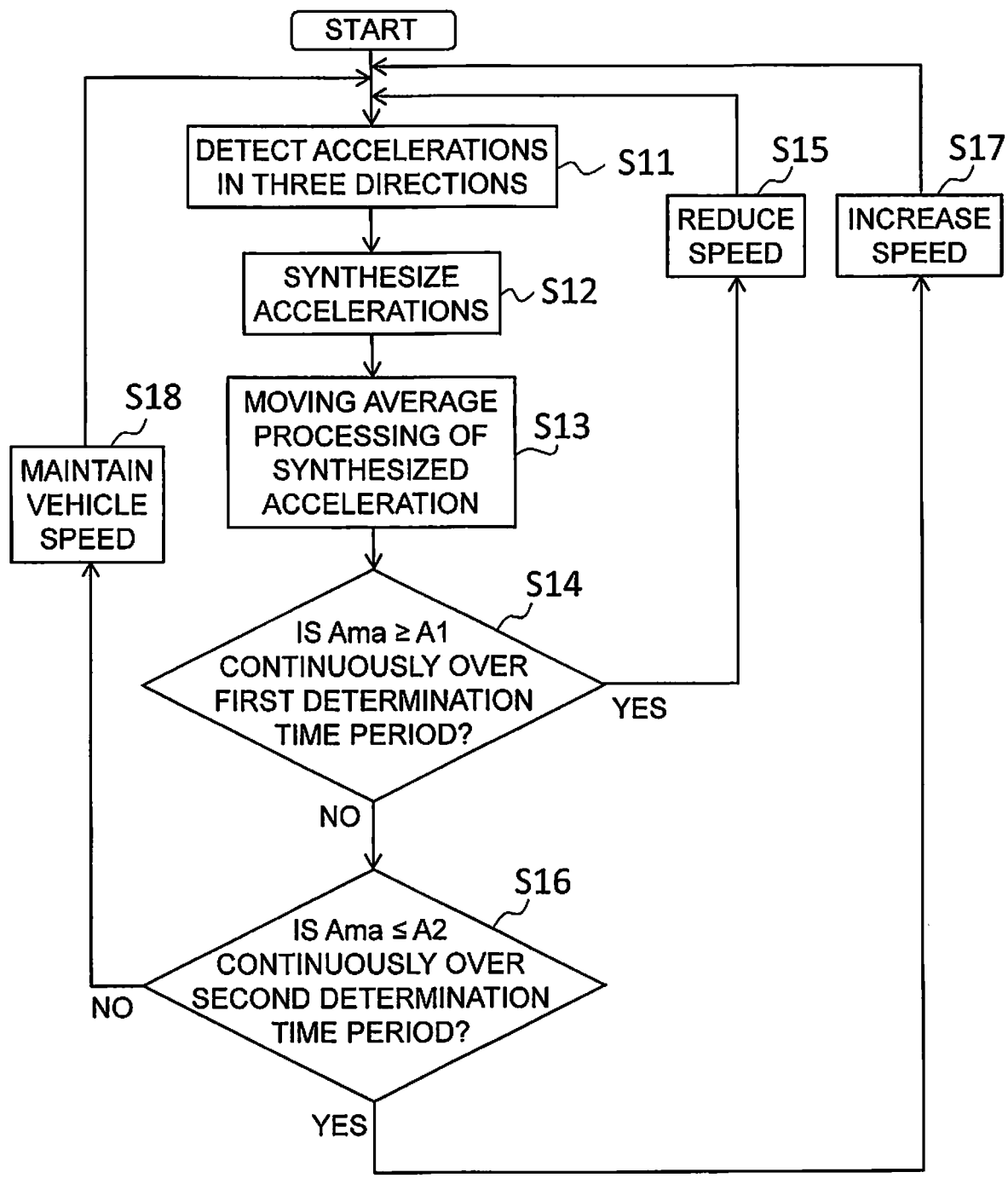
FIG. 8 is a flow chart illustrating processing of the vehicle speed automatic adjustment control according to a modified example.

The processing of the vehicle speed automatic adjustment control is not limited to the above-mentioned exemplary embodiment and may be changed. FIG. 8 is a flow chart illustrating processing of the vehicle speed automatic adjustment control according to a modified example. As illustrated in FIG. 8, the above-mentioned high-pass filtering in step S2 is omitted. Alternatively, the above-mentioned low-pass filtering in step S4 may be omitted.

Alternatively, as illustrated in step S13 in FIG. 8, moving average processing may be carried out on the synthesized acceleration. The moving average processing takes an average of a plurality of data in order to exclude fluctuation noise in the time series data. The remote controller 28 records the values of the synthesized accelerations in the memory device 44 in a time sequence. The remote controller 28 carries out the moving average processing on the values of the synthesized accelerations in real time using the recorded acceleration values.

In step S14, a determination is made as to whether the acceleration subjected to the moving average processing continues to be equal to or greater than the first threshold A1 over the first determination time period. In step S16, a determination is made as to whether the acceleration subjected to the moving average processing continues to be equal to or less than the second threshold A2 over the second determination time period. The other steps S11, S12, S15, S17 and S18 are respectively the same as the steps S1, S3, S6, S8 and S9.

While the acceleration in the up-down direction, the acceleration in the left-right direction, and the acceleration in the front-back direction of the work vehicle 1 are synthesized, only one of the above may be used in the determinations. Alternatively, two of the above accelerations may be used in the determinations. The acceleration used in the determinations preferably includes at least the acceleration in the up-down direction of the work vehicle 1.

In the above exemplary embodiment, the vehicle speed automatic adjustment control is temporarily canceled when a deceleration operation is carried out. However, because the acceleration resulting from the deceleration operation has a very small effect on the determinations in steps S5 and S7, the adjustment control may not be canceled. The reason for the very small effect is that the time period in which the acceleration resulting from the deceleration operation is generated is shorter than the first and second determination time periods for comparing the magnitudes of the acceleration Ama and the thresholds A1 and A2. Alternatively, the acceleration accompanying the deceleration operation has a high frequency and may be canceled out by low-pass filtering and thus the adjustment control may be continued.

The remote controller 28 in the above exemplary embodiment carries out the control for reducing the vehicle speed when the synthesized acceleration Ama continues to be equal to or greater than the first threshold A1 over the period of the first determination time period. However, the vehicle speed may be reduced when the synthesized acceleration Ama is greater than the first threshold A1. Similarly, the remote controller 28 in the above exemplary embodiment carries out the control for increasing the vehicle speed when the synthesized acceleration Ama continues to be equal to or less than the second threshold A2 over the period of the second determination time period. However, the vehicle speed may be increased when the synthesized acceleration Ama is less than the second threshold A2.

Figure 9:
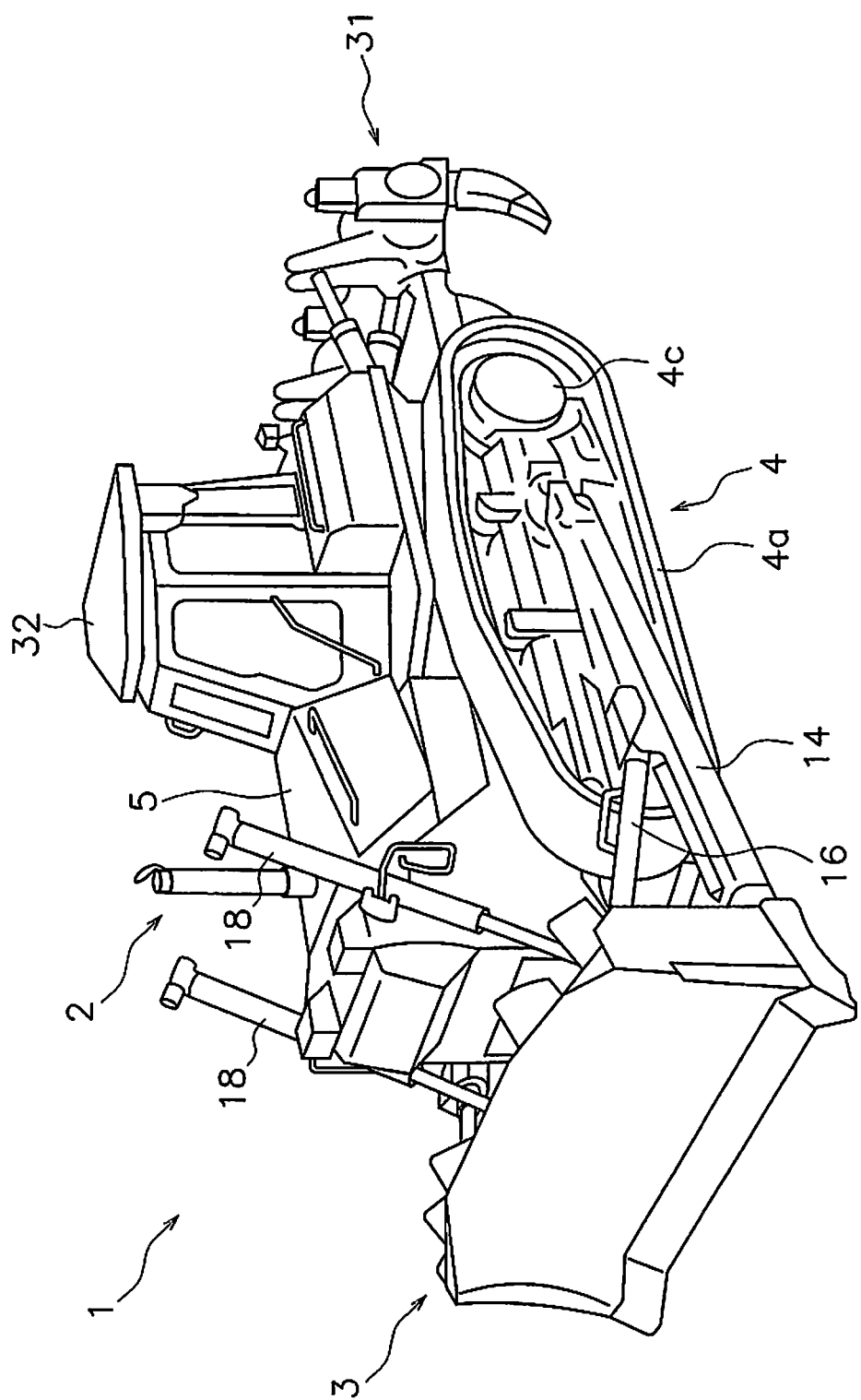
FIG. 9 is a perspective view of a work vehicle according to a modified example.

The structure of the work vehicle 1 is not limited to the above exemplary embodiment and may be changed. For example, the work vehicle 1 may be a vehicle that includes an operator's seat 32 as illustrated in FIG. 9. The work vehicle 1 is not limited to a vehicle that can be operated remotely and may be a vehicle that can be operated from the operator's seat 32.

According to the present invention, a reduction in work efficiency is limited and the continuous application of excessively large vibrations on the vehicle is limited by suitably adjusting the vehicle speed in response to the state of the road surface.

The invention claimed is:

1. A control system for a work vehicle, the control system comprising:
an acceleration detection device configured to detect an acceleration of the work vehicle; and
a controller configured to determine whether the acceleration is equal to or greater than a first threshold, reduce a vehicle speed when the acceleration continues to be equal to or greater than the first threshold over a predetermined first determination time period, determine whether the acceleration is equal to or less than a second threshold, and increase the vehicle speed when the acceleration continues to be equal to or less than the second threshold over a predetermined second determination time period, the second threshold being less than the first threshold.

2. The control system for a work vehicle according to claim 1, wherein
the acceleration includes an acceleration in an up-down direction of the work vehicle.

3. The control system for a work vehicle according to claim 1, wherein
the acceleration includes an acceleration in a left-right direction of the work vehicle.

4. The control system for a work vehicle according to claim 1, wherein
the acceleration includes an acceleration in a front-back direction of the work vehicle.

5. The control system for a work vehicle according to claim 1, wherein
the controller determines whether a synthesized acceleration, which is synthesized from at least two of the acceleration in the up-down direction of the work vehicle, the acceleration in the left-right direction of the work vehicle, and the acceleration in the front- back direction of the work vehicle, is equal to or greater than the first threshold.

6. The control system for a work vehicle according to claim 1, further comprising
a turning operating member for operating turning of the work vehicle,
when the turning operating member is being operated, the controller does not change the vehicle speed even when the controller determines that the acceleration is equal to or greater than the first threshold.

7. The control system for a work vehicle according to claim 1, wherein
the controller carries out low-pass filtering on the acceleration.

8. The control system for a work vehicle according to claim 1, wherein
the controller carries out high-pass filtering on the acceleration.

9. The control system for a work vehicle according to claim 1, wherein
the controller carries out moving average processing on the acceleration.

10. A control method for a work vehicle, the method comprising:
receiving detection signals indicating accelerations in a plurality of directions of the work vehicle;
synthesizing at least two of the accelerations in the plurality of directions and computing a synthesized acceleration;
determining whether the synthesized acceleration is equal to or greater than a first threshold;
outputting a command signal for reducing a vehicle speed when the synthesized acceleration is equal to or greater than the first threshold;
determining whether the synthesized acceleration is equal to or less than a second threshold, the second threshold being less than the first threshold; and
outputting a command signal for increasing the vehicle speed when the synthesized acceleration is equal to or less than the second threshold.

11. A control method for a work vehicle, the method comprising:
receiving a detection signal indicating an acceleration of the work vehicle;
determining whether the acceleration is equal to or greater than a first threshold;
outputting a command signal for reducing a vehicle speed when the acceleration is equal to or greater than the first threshold;
determining whether the acceleration is equal to or less than a second threshold, the second threshold being less than the first threshold; and
outputting a command signal for increasing the vehicle speed when the acceleration is equal to or less than the second threshold.

12. A work vehicle comprising:
an acceleration detection device configured to detect an acceleration of the work vehicle; and
a controller configured to reduce a vehicle speed when the acceleration continues to be equal to or greater than a first threshold over a predetermined first determination time period and increase the vehicle speed when the acceleration continues to be equal to or less than a second threshold over a predetermined second determination time period, the second threshold being less than the first threshold.

* * * * *